Jan. 30, 1945. G. A. LYON 2,368,231
FENDER SHIELD CONSTRUCTION AND ASSEMBLY
Filed Aug. 8, 1941
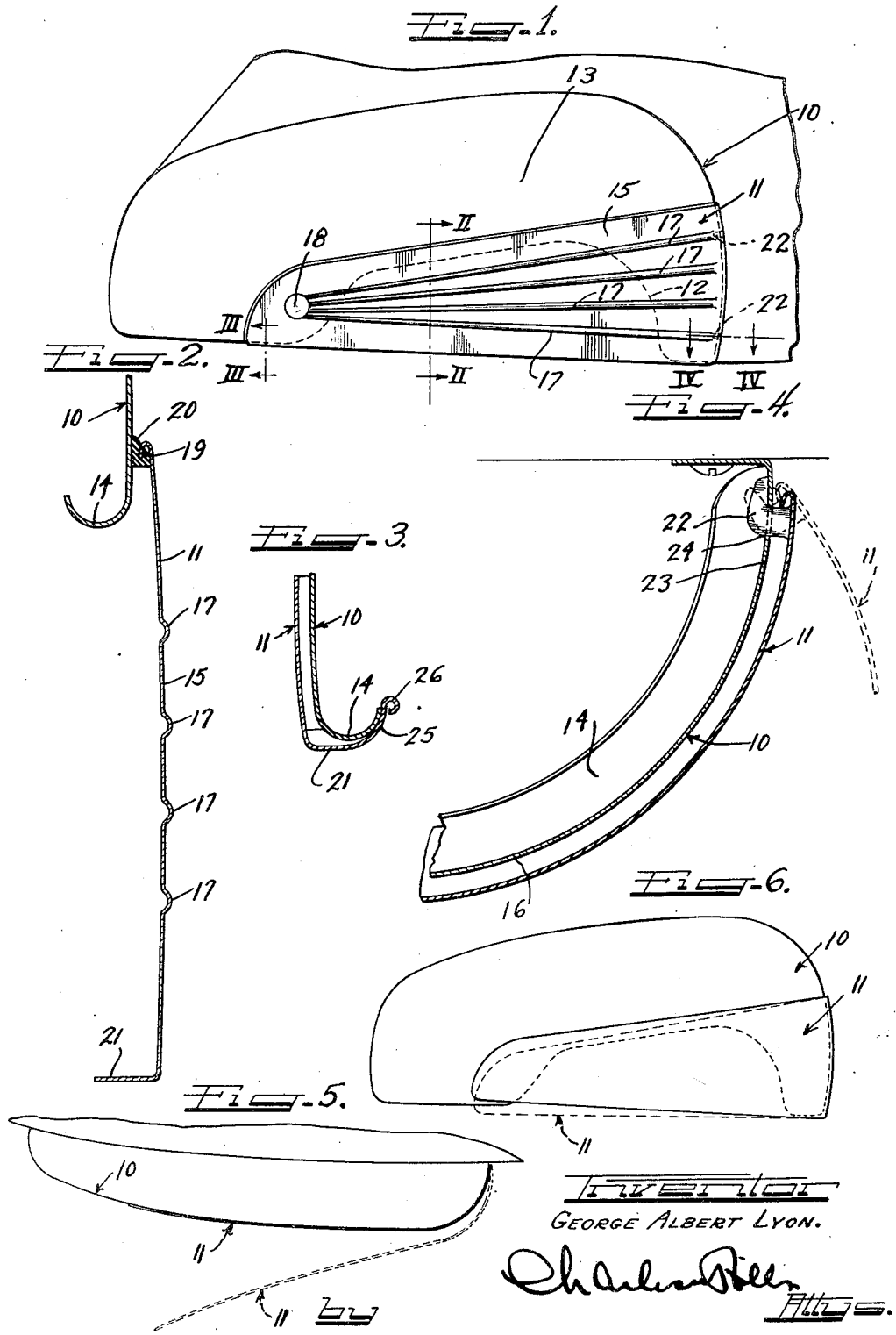
Inventor
George Albert Lyon.

Patented Jan. 30, 1945

2,368,231

UNITED STATES PATENT OFFICE 2,368,231

FENDER SHIELD CONSTRUCTION AND ASSEMBLY

George Albert Lyon, Allenhurst, N. J., assignor to Lyon Incorporated, Detroit, Mich., a corporation of Delaware Application August 8, 1941, Serial No. 405,928

8 Claims. (Cl. 280—153)

This invention relates to a fender shield construction and assembly, and more particularly to a fender shield having a cantilever support, the free end of which is resiliently held in place.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an unattractive outward appearance, detachable fender shields have been employed to substantially cover this opening.

As the term "fender shield" shall hereinafter be employed, it refers to any member which is adapted to be secured to a fender or other portion of a vehicle body for the purpose of covering the opening in the fender or vehicle body which is provided for access to and removal of the vehicle wheel. Furthermore, as the term "fender" shall hereinafter be employed, it refers to any form of wheel fender in its broad sense, whether such fender be separate from the vehicle body part, partly separate from the vehicle body part, or actually an integral part of the vehicle body, and whether or not it projects outwardly away from the principal body portion of the vehicle.

It is an object of the present invention to provide a fender shield construction and assembly of novel design and particularly a fender shield having novel means for securing a fender shield to a vehicle fender.

It is a further object of this invention to provide a fender and fender shield assembly which is economical to manufacture and which is rugged and reliable in use.

It is a still further object of this invention to provide a fender shield which is vertically supported at one end only.

Another object of this invention is to provide a fender shield and fender shield assembly in which a novel method and means is provided for resiliently securing the fender shield to the fender.

Another and further object of the present invention is to provide a novel means for warping or wrapping the fender shield into place on a vehicle fender.

A still further object of this invention is to provide a novel fender shield assembly in which the fender shield is supported on the fender as a cantilever.

The novel features which I believe to be characteristic of my invention are set forth with particularity in the appended claims. My invention itself, however, both as to its organization and method of operation and manner of construction, together with further objects and advantages thereof, may best be understood by reference to the accompanying drawing, in which:

Figure 1 is a front elevational view of a vehicle fender and fender shield assembly;

Figure 2 is a vertical sectional view through the fender shield and fender as taken along the line II—II of Figure 1;

Figure 3 is a vertical sectional view through a portion of the fender shield and fender as taken along the line III—III of Figure 1;

Figure 4 is a horizontal sectional view through the forward portion of the fender shield and fender as taken along the line IV—IV of Figure 1;

Figure 5 is a diagrammatic view indicating the first step of the operation in which the fender shield is warped into place on the fender; and, Figure 6 is a diagrammatic view indicating the second step of the operation in which the fender shield is warped into place on the vehicle fender.

Referring now to the various figures of the drawing which illustrate one embodiment of the present invention, there is illustrated therein a vehicle fender 10 having a fender shield 11 mounted thereon over the wheel access opening 12 in the outer depending side wall 13 of the fender 10. While the fender 10 may assume a wide variety of shapes without departing from the spirit and scope of the present invention, and may, indeed, be formed integral and made a part of the body itself (not shown), the fender 10 has been illustrated as being of a high crowned type. The fender shield 11 is detachably mounted on the fender 10 and is positioned to cover the relatively large opening 12 in the outer side wall 13 of the fender 10 which is conventionally provided in substantially all vehicle fenders to permit access to and removal of the vehicle wheel therethrough.

The lower edge of the fender 10, as well as the edge around the opening 12, is provided with a rolled flange portion 14, as is clearly shown in Figures 2, 3 and 4 of the drawing. This rolled flange portion 14 stiffens the fender in a manner well known to those skilled in the art.

The fender shield 11 comprises a sheet metal panel 15, which is large enough to cover the entire wheel opening 12, as well as to overlie part of the lower portion of the fender 10. More specifically, it is dimensioned to be positioned around and in close proximity to the lower front face 16 of the fender 10 and then back over a sufficient portion of the fender 10 to cover entirely the wheel opening 12. As is clearly shown in Figure 1 of the drawing, the shield is somewhat lower in height at its trailing end than at its forward or leading end. This provides an extremely attractive and pleasing contour to the fender shield 11.

The panel portion 15 of the fender shield 11 is provided with a plurality of raised ribs 17 which extend out in fan shape from a point 18 near the trailing edge of the fender toward the forward or leading edge of the fender. These raised ribs 17 not only provide a pleasing appearance to the outer face of the fender shield 11, but also serve to stiffen the panel over its broad face. The top and end edges of the fender shield 11 are bent back as at 19. A yieldable strip of rubber or other suitable cushioning material 20 is mounted on the turned back edge portion 19 to prevent a direct metal-to-metal contact between the fender shield 11 and the fender 10 around its outer peripheral edge. The rubber cushioning strip 20 may be secured to the fender shield in any suitable manner, such as by bonding, riveting, or indeed by just crimping the folded edge 19 tightly thereagainst, it being understood that a grooved or channel portion is provided in the rubber cushioning strip 20 for the reception of this edge portion 19. The lower or base edge of the fender shield 11 is bent directly inwardly as at 21.

The forward or leading end of the fender shield 11 is provided with a pair of L-shaped fingers 22 which are rigidly secured to the fender shield 11. As is clearly shown in Figure 4, these L-shaped fingers 22 extend first rearwardly and then inwardly, and lie substantially in a horizontal plane when the shield is in mounted position on the vehicle fender 10.

Opposite the fingers 22, slots are provided in the forward end wall 23 of the fender 10 and slots 24 are provided for receiving the L-shaped fingers 22 in the fender shield 11.

The base flange 21 of the fender shield 11 in proximity to its trailing end is bent upwardly as at 25 (Figure 3), the upper extremity of the portion 25 being provided with a bead 26. This portion of the fender shield, namely the flange portion 21 on the upturned portion 25, are arranged to extend under the rolled edge 14 of the fender 10 and extend up therebehind, as is shown in Figure 3.

The fender shield 11 is adapted to be stressed or placed under tension when it is moved into mounted engagement on the vehicle fender 10. To bring about the desired stressing of the fender shield 11, the fender shield in its unstressed and unstrained position is flared outwardly, or in other words is slightly concave, as is clearly shown by the dotted line in the diagrammatic top view of Figure 5. When the fender shield 11 is warped or wrapped into place against the fender 10, the curvature of the fender shield, as viewed from the top, is reversed so that it is slightly convex when viewed from the outer side.

To mount the fender shield in place on the fender, the L-shaped hooks 22 are inserted through the openings 24 in the forward wall 23 of the fender 10. The fender shield is then rocked in substantially a horizontal plane from the position as shown by the dotted line in Figure 4 to the full lines in Figure 4, and as shown by the dotted line in Figure 5 to the full lines in Figure 5. As will be apparent from an inspection of Figure 4, the L-shaped hooks 22 not only provide vertical supports for the fender shield 11 but also restrain outward movement of the fender shield 11 away from the fender 10 at the forward end. When the fender shield 11 has been warped or wrapped to a position where the trailing end of the fender shield lies substantially opposite the downwardly depending wall 13 of the fender 10, and as shown by the full lines in Figure 6, the trailing end of the fender shield 11 is sprung downwardly and inwardly until the curled lip portions 21, 25 of the fender shield 11 is snapped up under and around the rolled edge 14 of the base edge of the fender 10. The upstanding portion 25 prevents outward movement of the fender shield 11 away from the fender 10 and holds it in its wrapped or stressed position. The resiliency of the fender shield 11 itself holds the trailing edge of the fender shield 11 upwardly against the base edge of the fender 10.

From the above description it will be observed that a cantilever type of support is provided for the fender shield 11 on the fender 10. More specifically, the only vertical support for the fender shield 11 is provided by the pair of hooks 22 at the forward end of the shield. In addition to the cantilever support, it will be understood of course that the fender shield receives vertical support due to its frictional engagement around its entire peripheral edge with the fender 10 due to the fact that the fender shield 11 is tightly and resiliently pressed against the fender 10 when in mounted position.

To remove the fender shield 11 from the fender 10 the above operations are carried out in reverse order.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. The combination comprising a fender having a wheel opening in the side wall thereof, and a fender shield mounted thereon over the opening, said shield being vertically supported at one end only, and hook means at the other end of said shield extending under and behind the lower edge of said fender.

2. The combination comprising a fender having a wheel opening in the side wall thereof, and a fender shield mounted thereon over the opening, said shield being vertically supported at one end only, and hook means at the other end of said shield extending under and behind the lower edge of said fender, said shield being resiliently stressed in mounting to apply an upward biasing force on said hook means.

3. The combination comprising a fender having a wheel opening in the side wall thereof, and a fender shield mounted thereon over the opening, said shield being vertically supported at one end only, and hook means at the other end of said shield extending under and behind the lower edge of said fender, said shield being arranged to have the end where the hook means is located sprung downwardly as said shield is moved into mounted engagement on said fender and to thereafter allow said hook means to snap up into engagement with the lower edge of said fender.

4. The combination comprising a fender having a wheel opening in the side wall thereof, and a fender shield mounted thereon over the opening, means for supporting and securing said shield at one end thereof, said shield only upon movement to closed position being stressed in substantially a vertical plane about said supporting means and a stationary latch means at the other end of said shield for engaging said fender and for holding said shield in a stressed position.

5. A fender shield for covering the wheel opening in a vehicle fender comprising a sheet metal panel which is outwardly concave in a horizontal section plane when viewed from above, and supporting and latching means on said shield for retaining said shield on said fender, said shield being arranged to have its curvature reversed from outwardly concave to outwardly convex when placed in mounted position on said fender.

6. In a crowned fender construction including a curved front wall and a side wall having a wheel aperture therein, and a wrap around fender shield for disposition over the front wall and over the apertured side wall of the fender, said shield having hook means for cooperation with the fender front and being held over the apertured side wall of the fender as well as over the front solely by a snap-on connection.

7. The combination comprising a vehicle body part having a wheel opening in the side wall thereof and a shield mounted thereon over the opening, said shield having hook means at one end thereof for detachably engaging said vehicle body part, said hook means at said one end being the sole vertical support for said shield.

8. The combination comprising a vehicle body part having a wheel opening in the side wall thereof and a shield mounted thereon over the opening, said shield having hook-like means at one end thereof arranged to engage said vehicle body part and support said shield as a cantilever thereon.

GEORGE ALBERT LYON.